3,754,092
CONTROL OF MYCOPLASMA IN ANIMALS
WITH GROWTH PROMOTION
Paul A. Sartoretto, North Brunswick, N.J., assignor to
W. A. Cleary Corporation, Somerset, N.J.
No Drawing. Filed Oct. 7, 1970, Ser. No. 78,918
Int. Cl. A61k 27/00
U.S. Cl. 424—328                                     8 Claims

ABSTRACT OF THE DISCLOSURE

The method of preventing or controlling mycoplasma infection in an animal with simultaneous growth promotion by feeding an animal a feed containing a tetraalkylthiuram disulfide. The method is particularly useful in poultry.

---

This invention discloses compositions which when added to animal feed promote a substantial increase in growth and at the same time prevent and control mycoplasma in animals.

Mycoplasma is a blood disease in poultry and other animals that is quite prevalent throughout the world. Antibiotics are marketed for the prevention of mycoplasma, but they are expensive and, more importantly, they present a residue problem in edible meat. The Food and Drug Administration has expressed concern over antibiotic residues in meat because of the possibility of human disease organisms developing an immunity to the antibiotics which will render the antibiotics useless to humans at later dates.

It has been found according to this invention that the control and prevention of mycoplasma, with concomitant growth promotion, in an animal can be effected by including a safe but effective amount of one or more tetraalkylthiuram disulfides in feed for the animal. The amount of the disulfide included in the feed will generally be about 30 to 200 p.p.m. by weight with the specific amount included regulated according to the age of the animal as hereinafter explained. The tetraalkylthiuram disulfides useful in this invention can be represented by the formula:

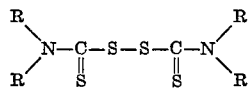

where the alkyl groups represented by R have 1 to 3 carbons and are methyl, ethyl or propyl but need not be the same although it is advisable that they be the same to give the tetramethyl, tetraethyl or tetrapropyl thiuram disulfides.

The tetramethyl and the tetraethyl thiuram disulfides are economical commercial bacteriostatic and fungistatic agents used chiefly for the prevention of disease in fruit and vegetable crops. Tetramethyl thiuram disulfide, referred to technically as thiram or TMTD, is an effective fungicide on bananas, celery, tomatoes, peaches and strawberries. It is considered so safe for use the Food and Drug Administration has permitted a residue tolerance of 7 parts per million in the fruits and vegetables. Although TMTD is a nonionic organic sulfur compound practically insoluble in water, it slowly hydrolyzes to low molecular weight thiocarbamic acids which are easily metabolized by the body. These compounds pose no residual buildups, nor do they exhibit carcinogenic properties. They are available commercially in pure form at about ½₀th the cost of the antibiotics.

The tetraalkylthiuram sulfides are mentioned in U.S. Pat. 2,610,140 as controlling coccidiosis in poultry at levels of 800 p.p.m. and upwards when administered in feed. But at these levels they are toxic. Unless 800 p.p.m. of tetraethylthiuram disulfide (TETD) is used, complete control of coccidiosis is not obtained. However, synergistic ratios of 70 to 140 p.p.m. of TETD admixed with 1130 p.p.m. to 2430 p.p.m. of sulfur were shown to give complete control. But neither one taken singly gave complete control.

The tetraalkylthiuram disulfide is readily administered to animals orally by including it in the animal feed. Thus, it can be included in a mash feed or scratch feed for poultry.

Dispersion of the tetraalkylthiuram disulfide in the feed can be effected by adding the drug in very fine micronized particulate form directly to the feed with mixing. Alternatively, the drug can be dispersed in water with the use of a wetting agent and the dispersion sprayed onto the feed with such mixing as is appropriate to achieve uniform dispersion of the drug in the feed. Nonionic wetting agents such as isooctyl phenoxy polyethoxy ethanol (Triton X-100) and nonyl phenoxy polyethoxy ethanol (Igepal CO 630) can be used. Only enough wetting agent is used to produce a stable dispersion. A minimum amount of water is used to effect addition of the drug to the feed.

Another method of incorporating the drug in the feed is to combine the drug with part of the feed to make a premix, such as one containing about 800 p.p.m. of drug, and to add the premix to the balance of the feed, such as in the ratio of 1 part premix to 10 parts of feed.

To obtain control and prevention of mycoplasma in poultry and suitable growth the amount of drug included in the feed is critical as is the age of poultry.

One-week old chickens given tetramethylthiuram disulfide (TMTD) at 200 p.p.m. in the feed did not display a hearty appetite for the food. After eight weeks of feeding, the chickens fed the drug had a 5% less weight gain than control chickens.

When one-day old chickens were fed with a feed containing 200 p.p.m. of TMTD, leg paralysis and weakening of the chickens were observed. The mortality rate was 35% and the surviving chickens showed almost a 50% weight loss at the end of a six week test period. One-day old chickens fed 75 p.p.m. and 100 p.p.m. of TMTD were also affected by leg paralysis to a lesser degree, and were set back sufficiently so that at the end of a six-week test period they showed a 14% and 16% loss in weight respectively over controls.

However, when one-week old chickens were fed for eight weeks with feed containing 80 p.p.m. of TMTD, they showed a weight gain of 20% over control chickens fed the same feed but without the TMTD. When this experiment was repeated, the chickens fed with 80 p.p.m. of TMTD showed a 23% increase in weight over the controls. All of the chicken from this flock had been isolated by the New Jersey State Department of Agriculture because they were offspring from parents that had mycoplasma. During the quarterly blood test report by the State of New Jersey, it was noted that none of the chickens receiving the treated feed had contracted mycoplasma whereas 27% of the flock used as controls were infected with the disease.

In another test, twenty-eight-day old chickens were fed with feed containing 100 p.p.m. and 200 p.p.m. of TMTD respectively. After ten days on the feed, the chickens were subjected to a nasal inoculation of mycoplasma culture. One month after inoculation, 90% of the control chickens had contracted mycoplasma, 58.6% of the conrtol chickens feed with feed containing an antibiotic had developed mycoplasma, and only 13.3% of the chickens on 100 p.p.m. of TMTD, and 10.3% of the chickens on 200 p.p.m. of TMTD, had contracted mycoplasma. The chickens on 100 p.p.m. TMTD had showed a 10% increase in weight, and the ones on 200 p.p.m. showed an 8.7 increase in weight over the controls. The chickens on the antibiotic feed showed no apparent increase in weight. Furthermore, the feed demand rate, i.e., the amount in pounds of feed required to produce a one pound weight gain, was 2.6 as compared with 3.0 for controls, and 2.9 for antibitoic treated feed.

The data shows freshly hatched chickens should not be fed treated feed containing 80 p.p.m. of TMTD until after they are at least one week old. Thereafter, if the feed contains about 80 p.p.m. of TMTD the chickens will thrive on the feed and exhibit growth promotion and will be protected from the disease, mycoplasma. After the chicken has reached the age of one month, it is possible to increase the concentration of TMTD in the feed from 100 to 200 p.p.m. and still obtain growth promotion and mycoplasma prevention. The optimum rate appears to be in the range of 80 to 200 p.p.m. of TMTD in the feed.

Another observation was made that hens on TMTD treatment for only eight weeks, were still clean of mycoplasma when inspected by the State of New Jersey 20 weeks later. Furthermore, eggs from the treated hens were smooth and large size as contrasted with eggs from control hens which were small and rough.

Although a dosage of 80 p.p.m. is slightly toxic to chickens younger than one week, lower levels could be included in starter feed for chickens from birth through the first week or two of life. Thus, 30 to 40 p.p.m. of TMTD could be used in the first week of life, and then the amount of drug increased to the higher rates for more mature chickens.

While the data presented so far is for TMTD, it is considered to be equally applicable to tetraethylthiuram disulfide and tetrapropylthiuram disulfide as well as other tetraalkylthiuram disulfides, in which the alkyls are mixed methyl, ethyl and propyl groups.

While the invention is particularly useful in poultry, it can also be used in raising other animals such as pigs and sheep.

EXAMPLE 1

Fifty-five (55) pounds of a standard feed containing a mixture of only fish meal, soybean meal and dehydrated alfalfa, with a 20% protein, 3.5% fat and 5% crude fiber content was placed in a small cement mixer, motor driven. 4.8 grams of a 42% micronized water dispersion of tetramethylthiuram disulfide (Arasan 42–S) was diluted in 90 ml. of water. This dispersion was sprayed in the form of a fine mist onto the tumbling feed.

The treated feed containing 80 p.p.m. of TMTD was fed to a brood of 22 white leghorns that were one-week old. After eight weeks on the chemically treated feed, one chicken had died. The remaining 21 chickens weighed 33.6 lbs., for an average of 1.6 lbs. per chicken. Of 22 control chickens fed the same feed, but without TMTD, 4 chickens died. The remaining 18 chickens weighed 22.8 lbs., for an average of 1.27 lbs. per chicken. This represents a 23% increase in weight for the treated chickens over the control chickens. When the chickens were blood tested by the New Jersey Department of Agriculture, none of the chickens had developed mycoplasma.

EXAMPLE 2

Fifty five (55) pounds of feed were treated with TMTD in a manner identical with the procedure used in Example 1, so that the feed contained 80 p.p.m., of TMTD. Twenty-five chickens were fed with the treated feed for a period of eight weeks beginning with one-week old chickens. At the end of the eight week feeding period, these chickens averaged 720 grams weight as compared with the controls that averaged 605 grams. None of the treated chickens had contracted mycoplasma, whereas 7 out of the 25 control chickens had developed the disease according to New Jersey State blood tests.

EXAMPLE 3

Twenty-eight day old broiler chickens were subjected to tests with TMTD treated feed. The feed was prepared in a manner similar to that described in Example 1, except one lot of feed contained 100 p.p.m. TMTD and the other lot contained 200 p.p.m. TMTD. Thirty chickens were used in each lot. There were 2 control lots. One lot of controls was fed a feed containing standard antimycotic agents. The second lot of controls was fed a feed containing no antibacterials. On the 10th day after the test was begun, all chickens were subjected to a nasal inoculation of a culture of mycoplasma organisms. Thirty days later the test was ended, and the following observations were made:

| Lot | Feed | Percent contracting mycoplasma | Average chicken weight increase, g. | Index [1] | Feed demand rate [2] |
| --- | --- | --- | --- | --- | --- |
| 1 | Plain feed | 90.0 | 872.5 | 99.9 | 3.0 |
| 2 | Plain feed plus antibiotic tylosin | 58.6 | 873.3 | 100 | 2.9 |
| 3 | Plain feed plus 100 p.p.m. TMTD | 13.3 | 963.3 | 110.3 | 2.6 |
| 4 | Plain feed plus 200 p.p.m. TMTD | 10.3 | 949.4 | 108.7 | 2.6 |

[1] Using the weight gain for the control antibiotic feed as a base of 100, the index is the ratio of:
$$\frac{\text{Weight gain from test feed}}{\text{Weight gain from control feed}} \times 100.$$
[2] The amount of feed, required to produce a one pound weight gain, in pounds,

What is claimed is:

1. A method of combatting mycoplasma infection in poultry less than about one week old and infected with or exposed to the causative agent of said disease, with simultaneous growth promotion, which comprises feeding said poultry a feed containing a safe but effective amount within the range of about 30 to less than 80 p.p.m. of a tetraalkylthiuram disulfide in which the alkyl groups have 1 to 3 carbons, and continuing said feeding for at least 30 days.

2. The method of claim 1 in which the poultry is a chicken.

3. A method of combatting mycoplasma infection in poultry at least about one week old and infected with or exposed to the causative agent of said disease, with simultaneous growth promotion, which comprises feeding said poultry a feed which contains as the sole antimycotic agent about 80 to 200 p.p.m. of a tetraalkylthiuram disulfide in which the alkyl groups have 1 to 3 carbons, and continuing said feeding for at least 30 days.

4. The method of claim 3 in which the poultry is a chicken.

5. The method of claim 4 in which the disulfide is tetramethylthiuram disulfide.

6. A method of combatting mycoplasma infection in poultry less than about one week old and infected with or exposed to the causative agent of said disease, with simultaneous growth promotion, which comprises feeding said poultry a feed which contains as the sole antimycotic agent about 30 to 40 p.p.m. of a tetraalkylthiuram disulfide in which the alkyl groups have 1 to 3 carbons, increasing the concentration of said antimycotic agent in said feed to about 80 to 200 p.p.m. when said poultry passes the age of one week, and continuing said feeding for at least 30 days.

7. The method of claim 6 in which the poultry is a chicken.

8. The method of claim 7 in which the disulfide is tetramethylthiuram disulfide.

References Cited

UNITED STATES PATENTS

| | | | |
|---|---|---|---|
| 2,610,140 | 9/1952 | Santivasi | 424—328 |
| 3,087,856 | 4/1963 | Actor et al. | 424—328 |

SAM ROSEN, Primary Examiner